(12) United States Patent
Kang et al.

(10) Patent No.: US 11,017,762 B2
(45) Date of Patent: May 25, 2021

(54) METHOD AND APPARATUS FOR GENERATING TEXT-TO-SPEECH MODEL

(71) Applicant: Baidu Online Network Technology (Beijing) Co., Ltd., Beijing (CN)

(72) Inventors: Yongguo Kang, Beijing (CN); Yu Gu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 143 days.

(21) Appl. No.: 16/236,076

(22) Filed: Dec. 28, 2018

(65) Prior Publication Data

US 2019/0355344 A1  Nov. 21, 2019

(30) Foreign Application Priority Data

May 18, 2018  (CN) .......................... 201810478000.0

(51) Int. Cl.
| | |
|---|---|
| *G10L 13/08* | (2013.01) |
| *G06N 3/08* | (2006.01) |
| *G06Q 20/00* | (2012.01) |
| *G10L 13/047* | (2013.01) |
| *G10L 25/30* | (2013.01) |

(52) U.S. Cl.
CPC ................ *G10L 13/08* (2013.01); *G06N 3/08* (2013.01); *G06Q 20/00* (2013.01); *G10L 13/047* (2013.01); *G10L 25/30* (2013.01)

(58) Field of Classification Search
CPC ..... G10L 13/047; G10L 13/08; G10L 13/027; G10L 13/043
See application file for complete search history.

(56) References Cited

U.S. PATENT DOCUMENTS

| | | | |
|---|---|---|---|
| 2015/0186359 A1 | 7/2015 | Fructuoso et al. | |
| 2017/0345411 A1* | 11/2017 | Raitio | ................ G10L 13/0335 |
| 2018/0268806 A1* | 9/2018 | Chun | ...................... G10L 19/00 |
| 2018/0336881 A1* | 11/2018 | Reber | ...................... G06N 3/02 |

FOREIGN PATENT DOCUMENTS

| | | |
|---|---|---|
| CN | 105118498 A | 12/2015 |
| JP | 2017-32839 A | 2/2017 |
| JP | 2018-13721 A | 1/2018 |

* cited by examiner

*Primary Examiner* — Thomas H Maung
(74) *Attorney, Agent, or Firm* — Seed IP Law Group LLP

(57) ABSTRACT

Embodiments of the present disclosure disclose a method and apparatus for generating a text-to-speech model. A specific implementation of the method includes: obtaining a training sample set, a training sample including sample text information, sample audio data corresponding to the sample text information, and a fundamental frequency of the sample audio data; obtaining an initial deep neural network; and using the sample text information of the training sample in the training sample set as an input, and using the sample audio data corresponding to the input sample text information and the fundamental frequency of the sample audio data as an output, to train the initial deep neural network using a machine learning method, and defining the trained initial deep neural network as the text-to-speech model.

6 Claims, 6 Drawing Sheets

METHOD AND APPARATUS FOR GENERATING TEXT-TO-SPEECH MODEL

CROSS-REFERENCE TO RELATED APPLICATIONS

This application is related to and claims priority from Chinese Application No. 201810478000.0, filed on May 18, 2018 and entitled "Method and Apparatus for Generating Text-To-Speech Model," the entire disclosure of which is hereby incorporated by reference.

TECHNICAL FIELD

Embodiments of the present disclosure relate to the field of computer technology, and specifically to a method and apparatus for generating a text-to-speech model.

BACKGROUND

The objective of text-to-speech (TTS) is to synthesize a speech signal corresponding to the text. Human-machine speech communication may be realized through text-to-speech. Text-to-speech may be divided into splicing text-to-speech and parameter text-to-speech.

SUMMARY

Embodiments of the present disclosure provide a method and apparatus for generating a text-to-speech model.

In a first aspect, the embodiments of the present disclosure provide a method for generating a text-to-speech model, the method including: obtaining a training sample set, a training sample including sample text information, sample audio data corresponding to the sample text information, and a fundamental frequency of the sample audio data; obtaining an initial deep neural network; and using the sample text information of the training sample in the training sample set as an input, and using the sample audio data corresponding to the input sample text information and the fundamental frequency of the sample audio data as an output, to training the initial deep neural network using a machine learning method, and defining the trained initial deep neural network as the text-to-speech model.

In some embodiments, the using the sample text information of the training sample in the training sample set as an input, and using the sample audio data corresponding to the input sample text information and the fundamental frequency of the sample audio data as an output, to train the initial deep neural network using a machine learning method, and defining the trained initial deep neural network as the text-to-speech model, includes: performing following training steps based on the training sample set: inputting sample text information of at least one training sample in the training sample set into the initial deep neural network, respectively, to obtain audio data corresponding to each piece of sample text information in the at least one piece of sample text information and a fundamental frequency of the audio data; comparing the audio data corresponding to the each piece of sample text information in the at least one piece of sample text information and the fundamental frequency of the audio data with a corresponding sample audio data and a fundamental frequency of the sample audio data; determining, based on a comparison result, whether the initial deep neural network reaches a preset optimization objective; and defining the initial deep neural network as the text-to-speech model, in response to determining the initial deep neural network reaching the optimization objective.

In some embodiments, steps of training to obtain the text-to-speech model further include: adjusting parameters of the initial deep neural network, and using unused training samples to form a training sample set, in response to determining the initial deep neural network not reaching the optimization objective, and using an adjusted initial deep neural network as the initial deep neural network to continue to perform the training steps.

In a second aspect, the embodiments of the present disclosure provide a method for synthesizing speech, the method including: obtaining to-be-processed text information; and inputting the to-be-processed text information into a text-to-speech model, and generating audio data corresponding to the to-be-processed text information, the text-to-speech model being generated according to the method described according to any one of the embodiments in the first aspect.

In a third aspect, the embodiments of the present disclosure provide an apparatus for generating a text-to-speech model, the apparatus including: a training sample set obtaining unit, configured to obtain a training sample set, a training sample including sample text information, sample audio data corresponding to the sample text information, and a fundamental frequency of the sample audio data; a network obtaining unit, configured to obtain an initial deep neural network; and a training unit, configured to use the sample text information of the training sample in the training sample set as an input, and use the sample audio data corresponding to the input sample text information and the fundamental frequency of the sample audio data as an output, to train the initial deep neural network using a machine learning method, and define the trained initial deep neural network as the text-to-speech model.

In some embodiments, the training unit is further configured to: perform following training steps based on the training sample set: inputting sample text information of at least one training sample in the training sample set into the initial deep neural network, respectively, to obtain audio data corresponding to each piece of sample text information in the at least one piece of sample text information and a fundamental frequency of the audio data; comparing the audio data corresponding to the each piece of sample text information in the at least one piece of sample text information and the fundamental frequency of the audio data with a corresponding sample audio data and a fundamental frequency of the sample audio data; determining, based on a comparison result, whether the initial deep neural network reaches a preset optimization objective; and defining the initial deep neural network as the text-to-speech model, in response to determining the initial deep neural network reaching the optimization objective.

In some embodiments, the training unit is further configured to: adjust parameters of the initial deep neural network, and use unused training samples to form a training sample set, in response to determining the initial deep neural network not reaching the optimization objective, and use an adjusted initial deep neural network as the initial deep neural network to continue to perform the training steps.

In a fourth aspect, the embodiments of the present disclosure provide an apparatus for synthesizing speech, the apparatus including: a to-be-processed text information obtaining unit, configured to obtain to-be-processed text information; and a generation unit, configured to input the to-be-processed text information into a text-to-speech model, and generate audio data corresponding to the to-beprocessed text information, the text-to-speech model being generated according to the method described according to any one of the embodiments in the first aspect.

In a fifth aspect, the embodiments of the present disclosure provide an electronic device, including: one or more processors; and a storage apparatus, storing one or more programs thereon, the one or more programs, when executed by the one or more processors, cause the one or more processors to implement the method according to any one of the embodiments in the first aspect.

In a sixth aspect, the embodiments of the present disclosure provide a computer readable medium, storing a computer program thereon, the computer program, when executed by a processor, implements the method according to any one of the embodiments in the first aspect.

In the method and apparatus for generating a text-to-speech model provided by the embodiments of the present disclosure, a training sample set is first obtained. Here, a training sample includes sample text information, sample audio data corresponding to the sample text information, and a fundamental frequency of the sample audio data. Then, an initial deep neural network is obtained. Finally the sample text information of the training sample in the training sample set is used as an input, and the sample audio data corresponding to the input sample text information and the fundamental frequency of the sample audio data is used as an output, to train the initial deep neural network using a machine learning method, and the trained initial deep neural network is defined as the text-to-speech model. Thus, the generated text-to-speech model may obtain corresponding audio data based on the text information without inputting the fundamental frequency.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
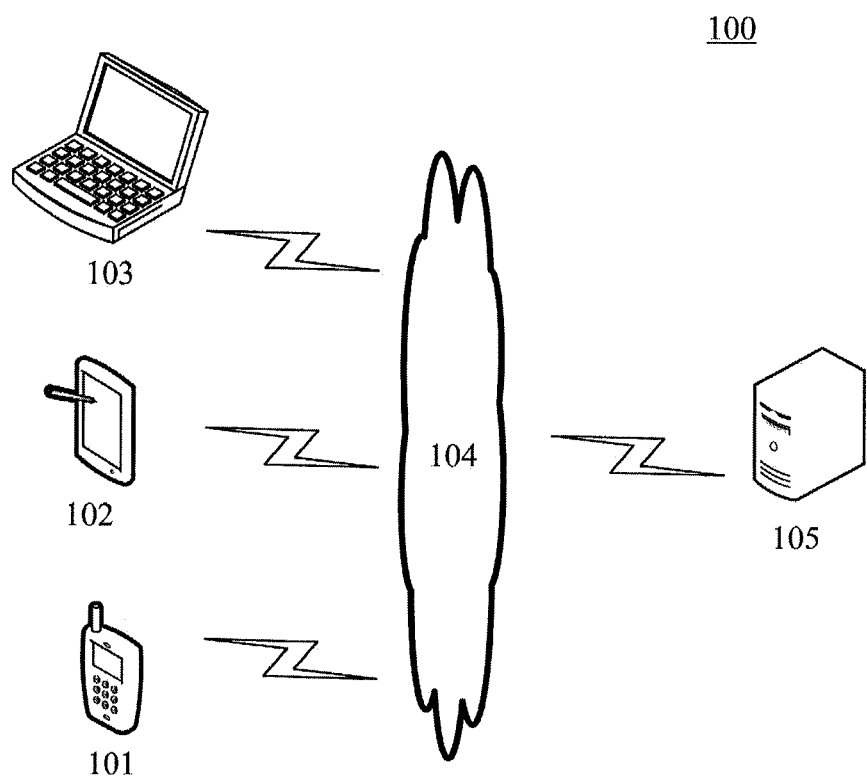
FIG. 1 is an architectural diagram of an exemplary system in which the present disclosure may be implemented.

FIG. 1 illustrates an exemplary system architecture 100 in which an embodiment of a method for generating a text-to-speech model or an apparatus for generating a text-to-speech model of the present disclosure may be implemented.

As shown in FIG. 1, the system architecture 100 may include terminal devices 101, 102, 103, a network 104 and a server 105. The network 104 is configured to provide a communication link medium between the terminal devices 101, 102, 103 and the server 105. The network 104 may include various types of connections, such as wired or wireless communication links, or optical fibers.

The terminal devices 101, 102 and 103 may interact with the server 105 through the network 104, for example, to send text information or the like to the server 105. Various client applications such as a recording application, a text processing application, or an audio processing application may be installed on the terminal devices 101, 102, and 103.

The terminal devices 101, 102 and 103 may be hardware or software. When the terminal devices 101, 102 and 103 are hardware, they may be various electronic devices having storage and transmission functions, including but not limited to smart phones, tablets, e-book readers, laptop portable computers, desktop computers, or the like. When the terminal devices 101, 102, 103 are software, they may be installed in the above-listed electronic devices. They may be implemented as a plurality of software or software modules, or as a single software or software module, which is not specifically limited here.

The server 105 may be a server providing various services, such as a backend server that generates a text-to-speech model using information sent by the terminal devices 101, 102, 103.

It should be noted that the method for generating a text-to-speech model provided by the embodiments of the present disclosure may be executed by the server 105. At this time, the apparatus for generating a text-to-speech model may be provided in the server 105. Alternatively, the method for generating a text-to-speech model may also be executed by the terminal devices 101, 102, 103. At this time, the apparatus for generating a text-to-speech model may be provided in the terminal devices 101, 102, 103, and the server 105 and the network 104 may not exist in the exemplary system architecture 100.

It should be noted that the server may be hardware or software. When the server is hardware, it may be implemented as a distributed server cluster composed of a plurality of servers, or may be implemented as a single server. When the server is software, it may be implemented as a plurality of software or software modules (for example, for providing distributed services), or as a single software or software module, which is not specifically limited here.

It should be appreciated that the numbers of the terminal devices, the networks and the servers in FIG. 1 are merely illustrative. Any number of terminal devices, networks and servers may be provided based on the actual requirements.

Figure 2:
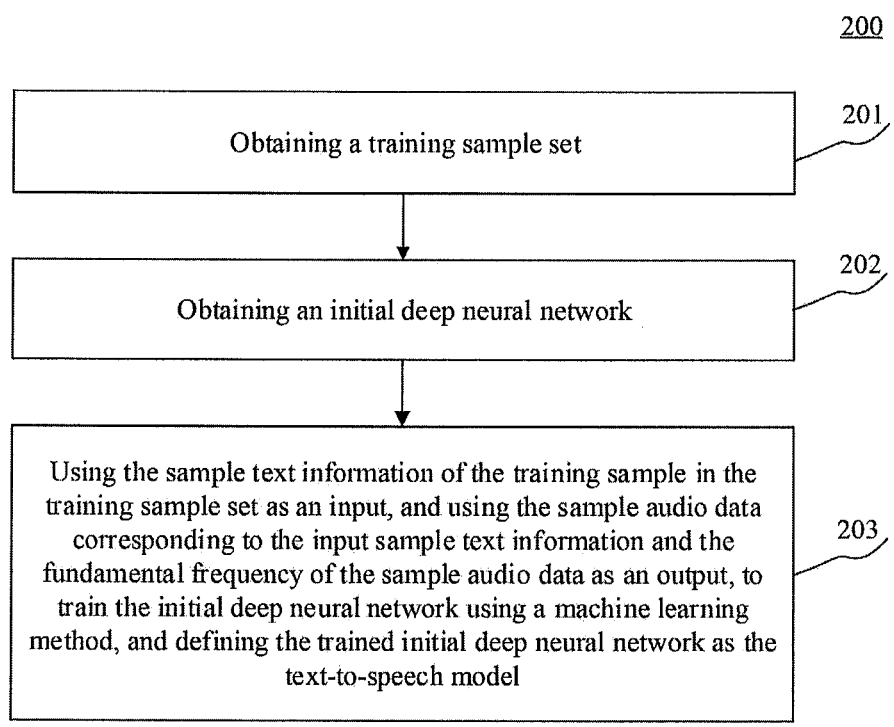
FIG. 2 is a flowchart of an embodiment of a method for generating a text-to-speech model according to the present disclosure.

With further reference to FIG. 2, a flow 200 of an embodiment of a method for generating a text-to-speech model according to the present disclosure is illustrated. The flow 200 of the method for generating a text-to-speech model includes the following steps.

Step 201, obtaining a training sample set.

In the present embodiment, the execution body of the method for generating a text-to-speech model may obtain a training sample set in various methods. The training sample set may be pre-stored in the terminal device, and the execution body may obtain the training sample set from the terminal device through a wired connection or a wireless connection. Alternatively, the training sample set may also be stored locally in the execution body. At this time, the execution body may directly obtain the training sample set locally.

In the present embodiment, a training sample in the training sample set includes sample text information, sample audio data corresponding to the sample text information, and a fundamental frequency of the sample audio data. Here, the text information may include text and linguistic characteristics of the text. Specifically, the text information may include at least one of the following: a word, a phrase, a phoneme, a syllable, a sentence characteristic (e.g., accent, number of syllables in a word, position of a syllable in a phrase), duration of a phoneme. The sample text information may be text information used as a training sample. Similarly, the sample audio data may be audio data used as a training sample. The fundamental frequency of the sample audio data may be the lowest frequency of the sample audio data. It should be noted that the sample audio data corresponding to the sample text information may be obtained by reading and recording the sample text by the reader.

In the present embodiment, as an example, the training sample set may directly use an existing data set, or may use an existing data set that has been processed (combined, added, deleted, etc.). In addition, the training sample set may also be generated based on a large amount of text information and corresponding audio data and fundamental frequencies of the audio data. Here, the generation of the training sample set is not limited.

Step 202, obtaining an initial deep neural network.

In the present embodiment, the execution body may obtain an initial deep neural network from the terminal device or locally. Here, the initial deep neural network may be a deep neural network that is untrained or not completely trained. A deep neural network usually consists of a large number of nodes (or neurons) interconnected, each node representing a specific output function called an activation function. The connection between every two nodes represents a weight value for a signal passing the connection, called weight (also called parameter), and the output of the network is different depending on the connection mode, weight value and activation function of the network.

In practice, an open source neural network for text-to-speech may be selected as the initial deep neural network. As an example, WaveNet, Deep Voice, Tacotron, etc. may be selected. Here, WaveNet is an autoregressive deep neural network. The network structure of WaveNet incorporates a dilated convolutional neural network (dilated CNN), a residual network, a gate structure, or the like. Here, the dilated CNN may increase the receptive field of the convolution kernel and utilize context information of a longer distance. The residual network may connect the previous input jump to the subsequent output, solving the gradient mass problem of the deep network. The gate structure is found in the LSTM (Long Short-Term Memory) model, which allows efficient selection of input information. Thus, WaveNet may output speech data based on input text characteristics and fundamental frequencies. Similar structures are included in Deep Voice and Tacotron networks.

It should be noted that for these open source neural networks for text-to-speech, the input, output, and number of layers of the networks may be adjusted according to actual needs. As an example, for WaveNet, the input and output may be changed, and an intermediate layer for obtaining the fundamental frequency based on the input text information may be added. Similarly, the neural networks such as Deep Voice and Tacotron may be adjusted as needed.

Step 203, using the sample text information of the training sample in the training sample set as an input, and using the sample audio data corresponding to the input sample text information and the fundamental frequency of the sample audio data as an output, to train the initial deep neural network using a machine learning method, and defining the trained initial deep neural network as the text-to-speech model.

In the present embodiment, the execution body may use the sample text information of the training sample in the training sample set as an input, use the sample audio data corresponding to the input sample text information and the fundamental frequency of the sample audio data as an output, train the initial deep neural network by using various methods, and define the trained initial deep neural network as the text-to-speech model. Here, the training methods include but are not limited to: single sample training method and batch sample training method.

As an example, the execution body may train the initial deep neural network by the single sample training method, and define the trained initial deep neural network as the text-to-speech model. Specifically, the following training steps are included.

In the first step, training samples are selected from the training sample set obtained in step 201. The sample text information included in the selected training samples is inputted to the initial deep neural network obtained in step 202, to obtain audio data corresponding to the input sample text information and the fundamental frequency of the audio data.

In the second step, the obtained audio data is compared with the corresponding sample audio data to obtain an audio data loss value. The obtained fundamental frequency of the audio data is compared with the fundamental frequency of the corresponding sample audio data to obtain a fundamental frequency loss value. Here, the loss value may be obtained based on a preset loss function. In practice, the loss function is usually used to estimate the degree of inconsistency between a predicted value (such as audio data) of a neural network and a real value (such as sample audio data). The loss function is a non-negative real-valued function. In general, the smaller the loss function is, the better the robustness of the neural network is. The loss function may be set according to actual needs, which is not specifically limited here.

In the third step, the obtained audio data loss value and the fundamental frequency loss value are compared with a target audio data loss value and a target fundamental frequency loss value, respectively. Then, based on the comparison result, it is determined whether the initial deep neural network training is completed. As an example, it is possible to count the ratio of samples that reach the target fundamental frequency loss value to the selected samples. If the ratio reaches a preset sample ratio (e.g., 95%), it may be determined that the initial deep neural network training is completed.

In the present embodiment, if the execution body determines that the initial deep neural network training is completed, the fourth step may be performed. If the execution body determines that the initial deep neural network training is not completed, the parameters of the initial deep neural network may be adjusted. As an example, a back propagation algorithm may be used to update the weight of the initial deep neural network. Then, training samples may be selected from the training sample set to continue to perform the above training steps.

In the fourth step, in response to determining that the initial deep neural network training is completed, the initial deep neural network is defined as the text-to-speech model; in response to determining that the initial deep neural network training is not completed, the relevant parameters of the initial deep neural network are adjusted, the adjusted initial deep neural network is defined as the initial deep neural network, and samples are re-selected from the training sample set to continue to perform the training steps.

Figure 3:
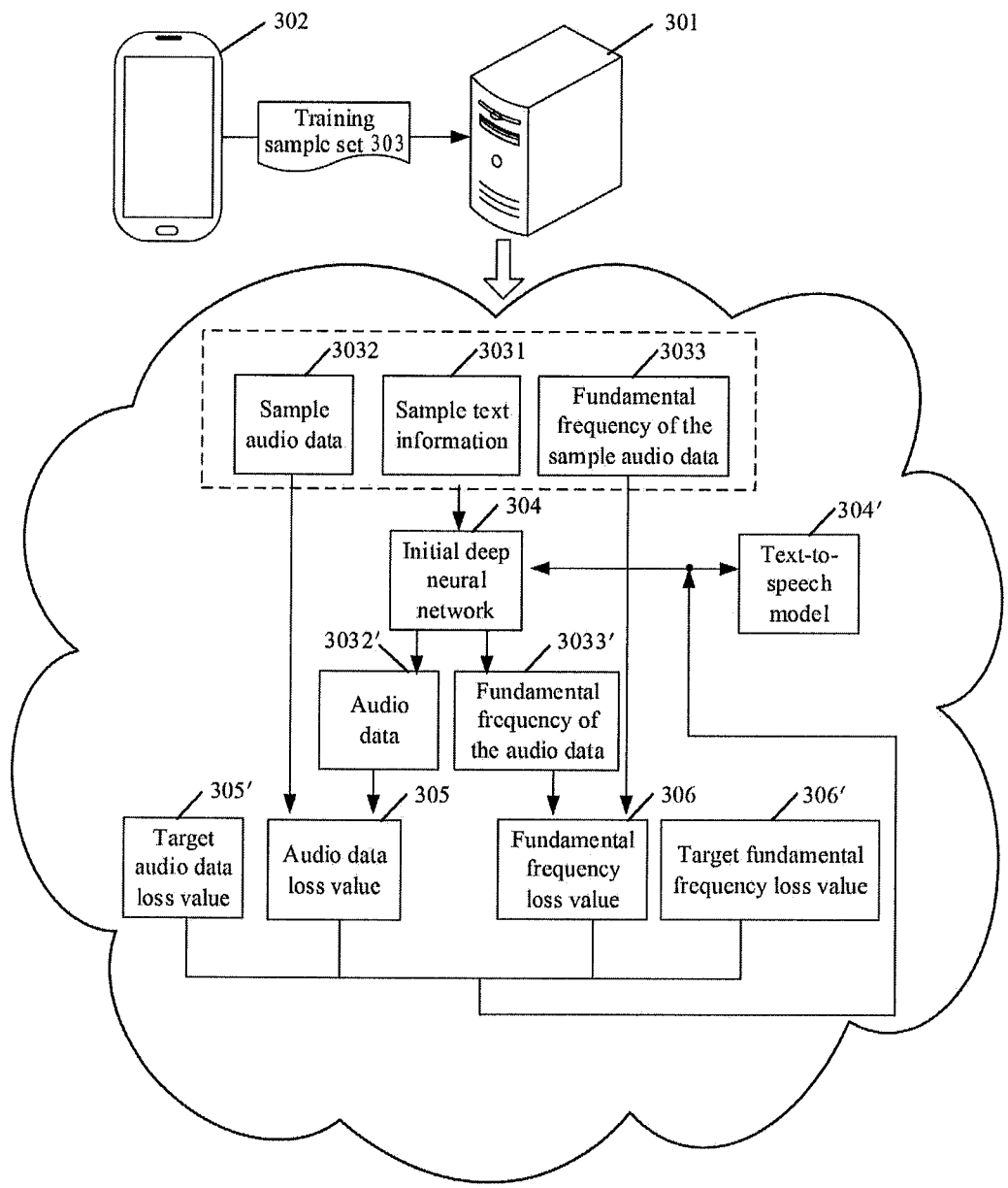
FIG. 3 is a schematic diagram of an application scenario of the method for generating a text-to-speech model according to the present disclosure.

With further reference to FIG. 3, FIG. 3 is a schematic diagram of an application scenario of the method for generating a text-to-speech model according to the present embodiment. In the application scenario of FIG. 3, a server 301 may first obtain a training sample set 303 from a mobile phone 302. A training sample in the training sample set 303 may include sample text information 3031, sample audio data 3032, and a fundamental frequency 3033 of the sample audio data. Then, an initial deep neural network 304 is obtained. Then, the sample text information 3031 is inputted to the initial deep neural network 304 to obtain audio data 3032' and an fundamental frequency 3033' of the audio data. The obtained audio data 3032' is compared with the sample audio data 3032 to obtain an audio data loss value 305. The obtained fundamental frequency 3033' of the audio data is compared with the fundamental frequency 3033 of the sample audio data to obtain a fundamental frequency loss value 306. The obtained audio data loss value 305 and the fundamental frequency loss value 306 are compared with a target audio data loss value 305' and a target fundamental frequency loss value 306', respectively. Then, based on the comparison result, it is determined whether the initial deep neural network training is completed. In response to determining that the initial deep neural network 304 training is completed, the initial deep neural network 304 is defined as a text-to-speech model 304'; and in response to determining that the initial deep neural network 304 training is not completed, the relevant parameters of the initial deep neural network 304 are adjusted, the adjusted initial deep neural network is defined as the initial deep neural network, and samples are re-selected from the training sample set to continue to perform the above training steps.

In the method provided by the embodiments of the present disclosure, a training sample set is first obtained. Here, a training sample includes sample text information, sample audio data corresponding to the sample text information, and a fundamental frequency of the sample audio data. Then, an initial deep neural network is obtained. Finally the sample text information of the training sample in the training sample set is used as an input, and the sample audio data corresponding to the input sample text information and the fundamental frequency of the sample audio data is used as an output, to train the initial deep neural network using a machine learning method, and the trained initial deep neural network is defined as the text-to-speech model. Thus, the generated text-to-speech model may obtain corresponding audio data based on the text information without inputting the fundamental frequency.

Figure 4:
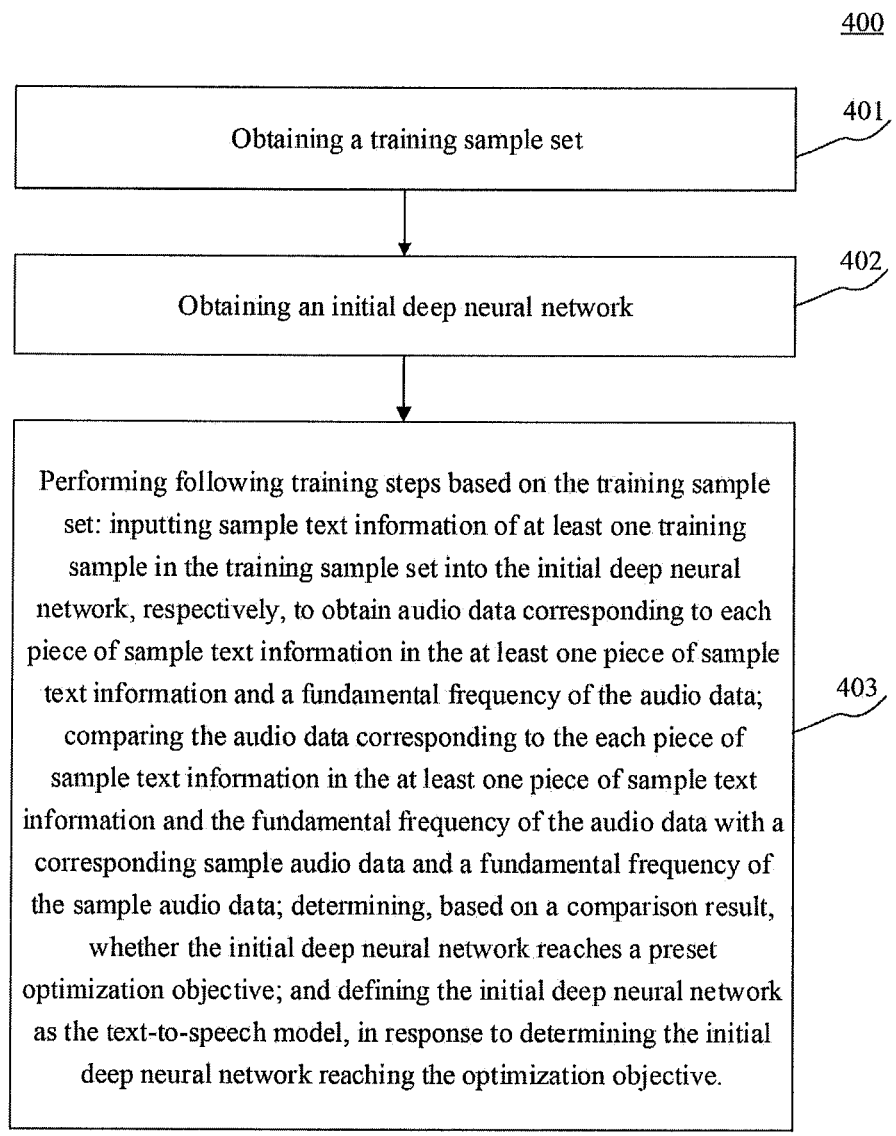
FIG. 4 is a flowchart of another embodiment of the method for generating a text-to-speech model according to the present disclosure.

With further reference to FIG. 4, a flow 400 of another embodiment of the method for generating a text-to-speech model is illustrated. The flow 400 of the method for generating a text-to-speech model includes the following steps.

Step 401, obtaining a training sample set.

In the present embodiment, a training sample includes sample text information, sample audio data corresponding to the sample text information, and a fundamental frequency of the sample audio data.

Step 402, obtaining an initial deep neural network.

The specific processing of the steps 401 and 402 and the technical effects thereof may refer to the steps 201 and 202 in the embodiment corresponding to FIG. 2, and detailed description thereof will be omitted.

Step 403, performing following training steps based on the training sample set.

First, sample text information of at least one training sample in the training sample set is inputted into the initial deep neural network, respectively, to obtain audio data corresponding to each piece of sample text information in the at least one piece of sample text information and a fundamental frequency of the audio data. Then, the audio data corresponding to the each piece of sample text information in the at least one piece of sample text information and the fundamental frequency of the audio data may be compared with a corresponding sample audio data and a fundamental frequency of the sample audio data. Based on a comparison result, it is determined whether the initial deep neural network reaches a preset optimization objective. As an example, the optimization objective may be convergence of the initial deep neural network. As an example, the optimization objective may be that the output accuracy of the initial deep neural network is greater than a preset accuracy threshold. Here, when the difference between the output audio data and the fundamental frequency of the audio data and the corresponding sample audio data and the fundamental frequency of the sample audio data is less than a preset difference threshold, the output audio data and the fundamental frequency of the audio data may be considered to be accurate. Finally, the initial deep neural network is defined as the text-to-speech model, in response to determining that the initial deep neural network reaching the optimization objective.

In some alternative implementations of the present embodiment, the steps of training to obtain the text-to-speech model (the step 403) may further include: adjusting parameters of the initial deep neural network, and using unused training samples to form a training sample set, in response to determining the initial deep neural network not reaching the optimization objective, and using an adjusted initial deep neural network as the initial deep neural network to continue to perform the training steps.

As can be seen from FIG. 4, compared with the embodiment corresponding to FIG. 2, the present embodiment trains the initial deep neural network by selecting at least one training sample every time. That is, the initial deep neural network is trained using the batch sample training method. Thereby, the training speed may be accelerated.

Figure 5:
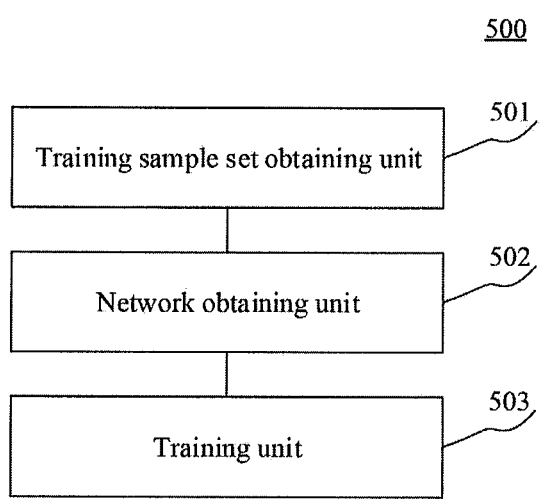
FIG. 5 is a schematic structural diagram of an embodiment of an apparatus for generating a text-to-speech model according to the present disclosure.

With further reference to FIG. 5, as an implementation to the method shown in the above figures, the present disclosure provides an embodiment of an apparatus for generating a text-to-speech model. The apparatus embodiment corresponds to the method embodiment shown in FIG. 2, and the apparatus may specifically be applied to various electronic devices.

As shown in FIG. 5, the apparatus 500 for generating a text-to-speech model of the present embodiment includes: a training sample set obtaining unit 501, a network obtaining unit 502 and a training unit 503. The training sample set obtaining unit 501 is configured to obtain a training sample set, a training sample including sample text information, sample audio data corresponding to the sample text information, and a fundamental frequency of the sample audio data. The network obtaining unit 502 is configured to obtain an initial deep neural network. The training unit 503 is configured to use the sample text information of the training sample in the training sample set as an input, and use the sample audio data corresponding to the input sample text information and the fundamental frequency of the sample audio data as an output, to train the initial deep neural network using a machine learning method, and define the trained initial deep neural network as the text-to-speech model.

In the present embodiment, in the apparatus 500 for generating a text-to-speech model, the specific processing of the training sample set obtaining unit 501, the network obtaining unit 502 and the training unit 503 and the technical effects thereof may refer to the steps 201-203 in the corresponding embodiment of FIG. 2, and detailed description thereof will be omitted.

In some alternative implementations of the present embodiment, the training unit 503 may be further configured to: perform following training steps based on the training sample set: inputting sample text information of at least one training sample in the training sample set into the initial deep neural network, respectively, to obtain audio data corresponding to each piece of sample text information in the at least one piece of sample text information and a fundamental frequency of the audio data; comparing the audio data corresponding to the each piece of sample text information in the at least one piece of sample text information and the fundamental frequency of the audio data with a corresponding sample audio data and a fundamental frequency of the sample audio data; determining, based on a comparison result, whether the initial deep neural network reaches a preset optimization objective; and defining the initial deep neural network as the text-to-speech model, in response to determining the initial deep neural network reaching the optimization objective.

In some alternative implementations of the present embodiment, the training unit 503 may be further configured to: adjust parameters of the initial deep neural network, and use unused training samples to form a training sample set, in response to determining the initial deep neural network not reaching the optimization objective, and use an adjusted initial deep neural network as the initial deep neural network to continue to perform the training steps.

In the present embodiment, the training unit 503 uses the sample text information of the training sample in the training sample set obtained by the training sample set obtaining unit 501 as an input, and the sample audio data and the fundamental frequency of the sample audio data corresponding to the input sample text information as an output, to train the initial deep neural network obtained by the network obtaining unit 502 using the machine learning method, and defines the trained initial deep neural network as the text-to-speech model. Thus, the generated text-to-speech model may obtain corresponding audio data based on the text information without inputting the fundamental frequency.

Figure 6:
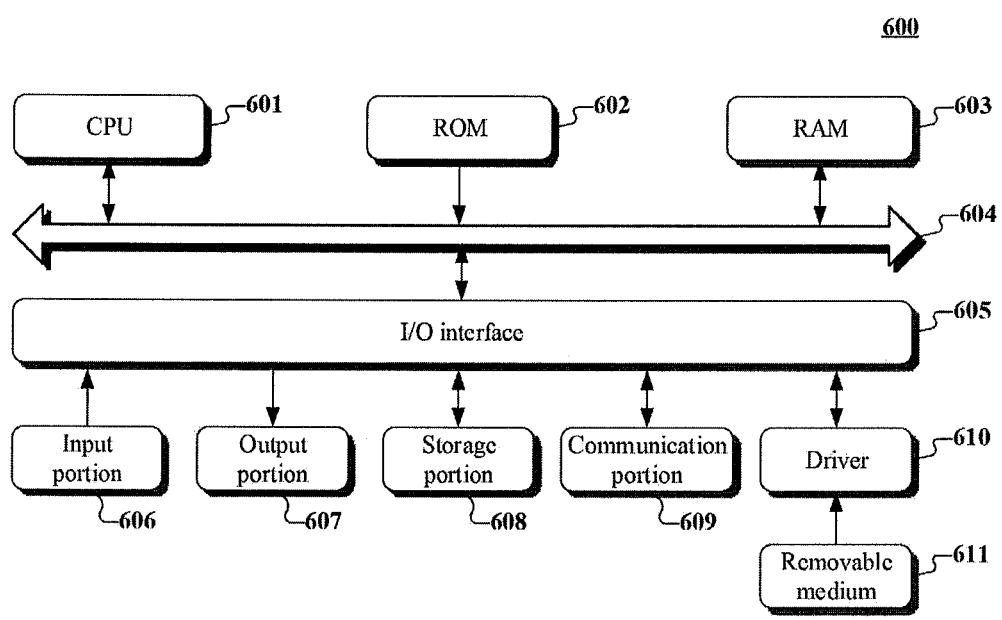
FIG. 6 is a schematic structural diagram of a computer system adapted to implement an electronic device of the embodiments of the present disclosure.

Referring to FIG. 6, a schematic structural diagram of a computer system 600 adapted to implement an electronic device of embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a training sample set obtaining unit, a network obtaining unit and a training unit. Here, the names of these units do not in some cases constitute a limitation to such units themselves. For example, the training sample set obtaining unit may also be described as "a unit for obtaining a training sample set."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: obtain a training sample set, a training sample including sample text information, sample audio data corresponding to the sample text information, and a fundamental frequency of the sample audio data; obtain an initial deep neural network; and use the sample text information of the training sample in the training sample set as an input, and use the sample audio data corresponding to the input sample text information and the fundamental frequency of the sample audio data as an output, to train the initial deep neural network using a machine learning method, and define the trained initial deep neural network as the text-to-speech model.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating a text-to-speech model, the method comprising:

obtaining a training sample set, a training sample comprising sample text information, sample audio data corresponding to the sample text information, and a fundamental frequency of the sample audio data;

obtaining an initial deep neural network; and performing the following training steps based on the training sample set: inputting sample text information of at least one training sample in the training sample set into the initial deep neural network, respectively, to obtain audio data corresponding to each piece of sample text information in the at least one piece of sample text information and a fundamental frequency of the audio data; comparing the audio data corresponding to the each piece of sample text information in the at least one piece of sample text information with a corresponding sample audio data to obtain an audio data loss value corresponding to the each piece of sample text information, and comparing the fundamental frequency of the audio data with a fundamental frequency of the sample audio data to obtain a fundamental frequency loss value corresponding to the each piece of sample text information; comparing the audio data loss value with a target audio data loss value and comparing the fundamental frequency loss value with a target fundamental frequency loss value to obtain a comparison result; determining, based on the comparison result, whether the initial deep neural network reaches a preset optimization objective; and defining the initial deep neural network as the text-to-speech model, in response to determining the initial deep neural network reaching the preset optimization objective, the preset optimization objective including an output accuracy of the initial deep neural network being greater than a preset accuracy threshold.

2. The method according to claim 1, wherein the method further comprises:

adjusting parameters of the initial deep neural network, and using unused training samples to form a training sample set, in response to determining the initial deep neural network not reaching the preset optimization objective, and using an adjusted initial deep neural network as the initial deep neural network to continue to perform the training steps.

3. An apparatus for generating a text-to-speech model, the apparatus comprising:

at least one processor; and a memory storing instructions, the instructions when executed by the at least one processor, cause the at least one processor to perform operations, the operations comprising:

obtaining a training sample set, a training sample comprising sample text information, sample audio data corresponding to the sample text information, and a fundamental frequency of the sample audio data;

obtaining an initial deep neural network; and performing the following training steps based on the training sample set: inputting sample text information of at least one training sample in the training sample set into the initial deep neural network, respectively, to obtain audio data corresponding to each piece of sample text information in the at least one piece of sample text information and a fundamental frequency of the audio data; comparing the audio data corresponding to the each piece of sample text information in the at least one piece of sample text information with a corresponding sample audio data to obtain an audio data loss value corresponding to the each piece of sample text information, and comparing the fundamental frequency of the audio data with a fundamental frequency of the sample audio data to obtain a fundamental frequency loss value corresponding to the each piece of sample text information; comparing the audio data loss value with a target audio data loss value and comparing the fundamental frequency loss value with a target fundamental frequency loss value to obtain a comparison result; determining, based on the comparison result, whether the initial deep neural network reaches a preset optimization objective; and defining the initial deep neural network as the text-to-speech model, in response to determining the initial deep neural network reaching the preset optimization objective, the preset optimization objective including an output accuracy of the initial deep neural network being greater than a preset accuracy threshold.

4. The apparatus according to claim 3, wherein the operations further comprise:

adjusting parameters of the initial deep neural network, and use unused training samples to form a training sample set, in response to determining the initial deep neural network not reaching the preset optimization objective, and using an adjusted initial deep neural network as the initial deep neural network to continue to perform the training steps.

5. A non-transitory computer storage medium storing a computer program, the computer program when executed by one or more processors, causes the one or more processors to perform operations, the operations comprising:

obtaining a training sample set, a training sample comprising sample text information, sample audio data corresponding to the sample text information, and a fundamental frequency of the sample audio data;

obtaining an initial deep neural network; and performing the following training steps based on the training sample set: inputting sample text information of at least one training sample in the training sample set into the initial deep neural network, respectively, to obtain audio data corresponding to each piece of sample text information in the at least one piece of sample text information and a fundamental frequency of the audio data; comparing the audio data corresponding to the each piece of sample text information in the at least one piece of sample text information with a corresponding sample audio data to obtain an audio data loss value corresponding to the each piece of sample text information, and comparing the fundamental frequency of the audio data with a fundamental frequency of the sample audio data to obtain a fundamental frequency loss value corresponding to the each piece of sample text information; comparing the audio data loss value with a target audio data loss value and comparing the fundamental frequency loss value with a target fundamental frequency loss value to obtain a comparison result; determining, based on the comparison result, whether the initial deep neural network reaches a preset optimization objective; and defining the initial deep neural network as the text-to-speech model, in response to determining the initial deep neural network reaching the preset optimization objective, the preset optimization objective including an output accuracy of the initial deep neural network being greater than a preset accuracy threshold.

6. The non-transitory computer storage medium according to claim 5, wherein the operations further comprise:

adjusting parameters of the initial deep neural network, and using unused training samples to form a training sample set, in response to determining the initial deep neural network not reaching the preset optimization objective, and using an adjusted initial deep neural network as the initial deep neural network to continue to perform the training steps.

* * * * *